(12) United States Patent
Ushiro et al.

(10) Patent No.: US 12,118,761 B2
(45) Date of Patent: Oct. 15, 2024

(54) INFORMATION PROCESSING APPARATUS AND INFORMATION PROCESSING METHOD

(71) Applicant: NTT DOCOMO, INC., Tokyo (JP)

(72) Inventors: Tomoe Ushiro, Tokyo (JP); Naoki Kameyama, Tokyo (JP); Yuichiro Segawa, Tokyo (JP); Yasuhiro Kitamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 309 days.

(21) Appl. No.: 17/617,705

(22) PCT Filed: Jun. 25, 2020

(86) PCT No.: PCT/JP2020/025010
§ 371 (c)(1),
(2) Date: Dec. 9, 2021

(87) PCT Pub. No.: WO2020/262529
PCT Pub. Date: Dec. 30, 2020

(65) Prior Publication Data
US 2022/0234731 A1    Jul. 28, 2022

(30) Foreign Application Priority Data
Jun. 27, 2019  (JP) .................. 2019-120213

(51) Int. Cl.
*B64C 39/02* (2023.01)
*A01K 29/00* (2006.01)
(Continued)

(52) U.S. Cl.
CPC ............ *G06V 20/17* (2022.01); *A01K 29/005* (2013.01); *G05D 1/101* (2013.01); *G06V 40/10* (2022.01); *B64U 10/13* (2023.01); *B64U 2101/31* (2023.01)

(58) Field of Classification Search
CPC .... B64C 39/024; A01K 29/005; A01K 29/00; G05D 1/101; G05D 1/0088; G06V 20/17;
(Continued)

(56) References Cited

U.S. PATENT DOCUMENTS

2018/0146645 A1* 5/2018 Arbel .................. A01K 11/006

FOREIGN PATENT DOCUMENTS

CN    110058610 A  *  7/2019
JP    2016208065 A     12/2016

OTHER PUBLICATIONS

Zhang et al. CN110058610 (A)—EPO machine translation (Year: 2019).*

(Continued)

*Primary Examiner* — Yuen Wong
(74) *Attorney, Agent, or Firm* — DILWORTH IP, LLC

(57) ABSTRACT

Server apparatus, by controlling aerial vehicle, causes aerial vehicle to fly within a close range of an animal group, and causes aerial vehicle to capture images of the animal group. Aerial vehicle transmits captured image data to server apparatus via communication network, and server apparatus checks a health state of animals of the animal group using the captured image data with a method such as image analysis. Server apparatus performs machine learning using position information history of wireless terminals attached to animals (that is, a movement history of the animal group), specifies an area for checking the state of the animal group, and causes aerial vehicle to fly to the specified area and to capture images of the animal group.

8 Claims, 3 Drawing Sheets

(51) Int. Cl.
  *G05D 1/00* (2006.01)
  *G06V 20/17* (2022.01)
  *G06V 40/10* (2022.01)
  *B64U 10/13* (2023.01)
  *B64U 101/31* (2023.01)

(58) Field of Classification Search
  CPC .. G06V 40/10; G06V 40/103; B64U 2101/30; Y02A 40/70; H04N 5/222
  See application file for complete search history.

(56) References Cited

OTHER PUBLICATIONS

International Search Report issued in corresponding PCT Application No. PCT/JP2020/025010, dated Sep. 24, 2020.

\* cited by examiner

INFORMATION PROCESSING APPARATUS AND INFORMATION PROCESSING METHOD

TECHNICAL FIELD

The present invention relates to a technique for remotely checking a state of animals such as livestock.

BACKGROUND

A technique for analyzing animal behavior has been proposed. For example, Japanese Patent Application No. JP-2016-208065A discloses a technique for investigating habitats of wild animals using a drone, and displaying the habitats of the wild animals via overlay on a map.

SUMMARY OF INVENTION

There are cases where a health or the like of livestock can be approximately estimated from the livestock's external appearance. In such cases, it is convenient if a mechanism is remotely available to enable efficient observation of an external appearance of a large number of livestock. Accordingly, an object of the present invention is to provide a technique that enables efficient checking of a state of an animal group such as livestock.

To achieve the stated object, the present invention provides an information processing apparatus including: a specifying unit configured to specify a checking area for checking a state of an animal group based on a movement history of the animal group; and a control unit configured to control flight of an aerial vehicle to the checking area specified by the specifying unit for capture of images of the group of animals.

The specifying unit may specify a checking area in which animals of a threshold number or more that face in a same direction as determined from a movement direction specified from a movement history of the animal group, and the control unit may cause the aerial vehicle to fly in a direction directly facing the animal group so as to capture faces of the animals in a checking area specified by the specifying unit.

The specifying unit may specify the checking area and a time within which the animal group stays in the checking area based on a movement history of the animal group, and the control unit may perform control such that the aerial vehicle is caused to fly so as to arrive at the checking area specified by the specifying unit at the time specified by the specifying unit.

The specifying unit may specify the checking area based on weather information history when the animal group moved, in addition to the movement history of the animal group.

The specifying unit may specify the checking area based on a difference between the movement route of the animal group that was estimated based on the movement history of the animal group and latest position information of the animal group.

The specifying unit may further specify the checking area based on image capture conditions when the aerial vehicle captures images of the animal group.

The specifying unit may extract individual animals from the animal group, which were not regularly captured in a first checking area in which the state of the animal group is checked, and specify a second checking area in which states of the extracted individuals animals are checked, and the control unit may perform control such that the aerial vehicle is caused to fly to the first checking area and second checking area specified by the specifying unit.

The present invention also provides an information processing method including: specifying a checking area for checking a state of an animal group based on a movement history of the animal group; and performing control such that an aerial vehicle that captures images of the animal group is caused to fly to the checking area specified by the specifying unit.

According to the present invention, a state of an animal group such as livestock can be efficiently checked.

DETAILED DESCRIPTION

Configuration

Figure 1:
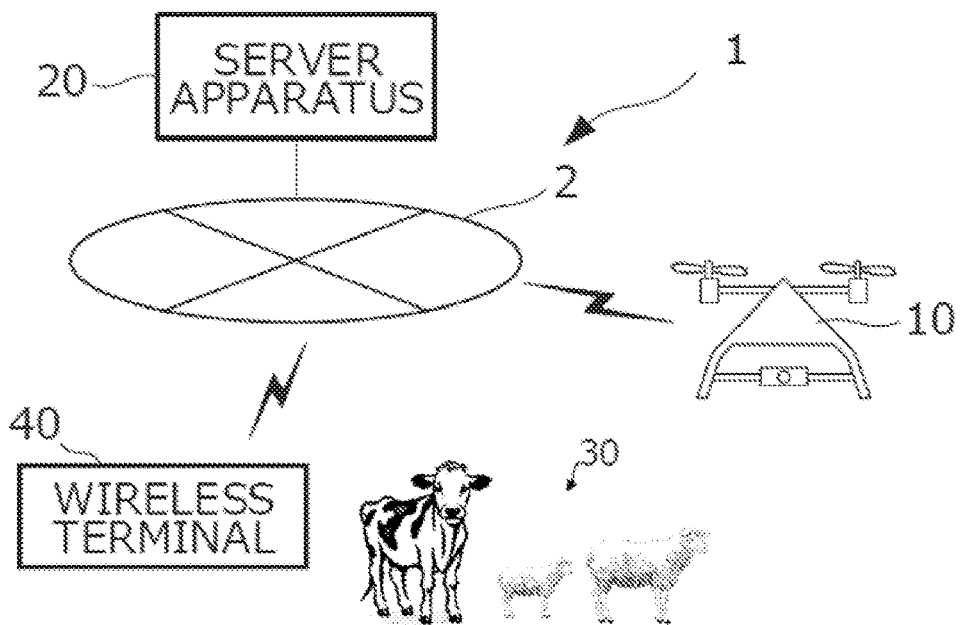
FIG. 1 is a diagram illustrating an example of a configuration of flight system in accordance with the present invention.

FIG. 1 is a diagram illustrating an example of a configuration of flight system 1. Flight system 1 is a system for checking states of a large number of livestock (animal group) such as cattle or sheep that are put out to pasture on a stock farm, for example. Flight system 1 includes unmanned aerial vehicle 10, referred to as a drone, server apparatus 20, wireless terminal 40 attached to a predetermined part of animal 30, and communication network 2 for communicably connecting these apparatuses. Server apparatus 20 functions as an information processing apparatus for controlling aerial vehicle 10. Communication network 2 includes a wireless communication network that conforms to LTE (Long Term Evolution) or another communication standard, for example.

Server apparatus 20, by controlling aerial vehicle 10, causes aerial vehicle 10 to fly within close range of an animal group, and capture images of the animal group. Aerial vehicle 10 transmits captured image data of the animal group to server apparatus 20 via communication network 2, and server apparatus 20 checks a health state of animals using the captured image data by way of a method such as image analysis. Server apparatus 20 performs machine learning using position information history of wireless terminals 40 attached to animals 30 (that is, movement history of the animal group), specifies an area suitable for checking the state of the animal group (hereinafter, "checking area"), and causes aerial vehicle 10 to fly to the specified checking area and capture images of the animal group.

Figure 2:
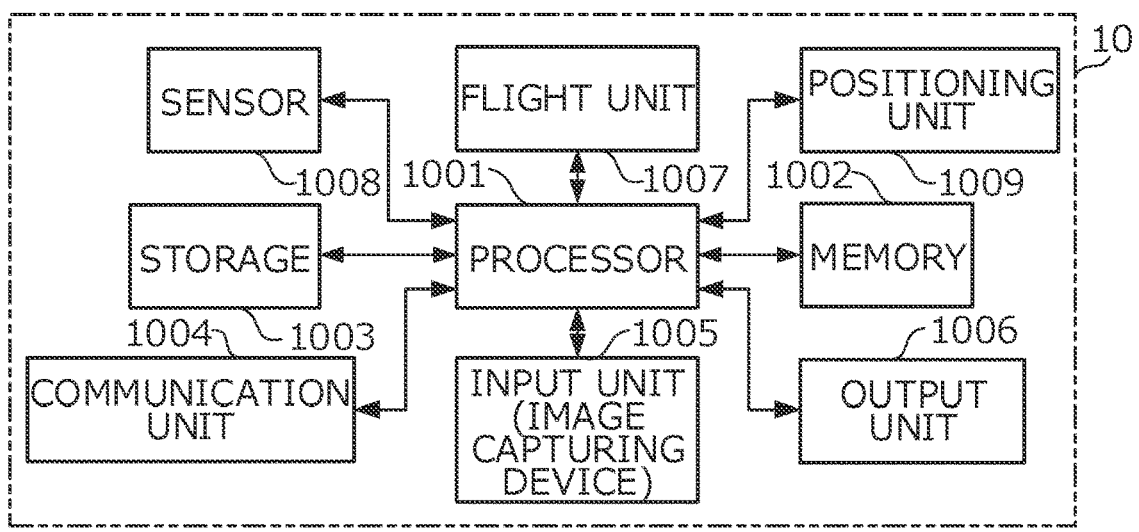
FIG. 2 is a diagram illustrating a hardware configuration of aerial vehicle in accordance with the present invention.

FIG. 2 is a diagram illustrating a hardware configuration of aerial vehicle 10. Physically, aerial vehicle 10 is configured as a computer apparatus that includes processor 1001, memory 1002, storage 1003, communication unit 1004, input unit 1005, output unit 1006, flight unit 1007, sensor 1008, GPS unit 1009, a bus for connecting these apparatuses, and the like. These apparatuses operate using power supplied from a battery (not illustrated). It is of note that in the following description the term "apparatus" can be replaced with "circuit," "device," "unit" or the like. The hardware configuration of aerial vehicle 10 may also be configured to include, with respect to each apparatus shown in the diagram, one or a plurality of the apparatuses, or may also be configured to not include some apparatuses.

Functions of aerial vehicle 10 are realized by causing predetermined software (programs) to be loaded in hardware such as processor 1001 and memory 1002 and processor 1001 that perform computational operations to control communication by communication unit 1004, and to control at least one of reading and writing of data in memory 1002 and storage 1003.

Processor 1001 controls the computer as a whole by causing an operating system to run, for example. Processor 1001 may be constituted of a central processing unit (CPU) including an interface with peripheral apparatuses, a control apparatus, a computational operation apparatus, registers, and the like. Also, a baseband signal processing unit, a call processing unit, and the like may be realized by processor 1001, for example.

Processor 1001 reads a program (program code), a software module, data, and the like from at least one of storage 1003 and communication unit 1004 into memory 1002, and executes various processing in accordance with the read-out program and the like. A program that causes a computer to execute at least some of the later-described operations is used as the program. The functional blocks of aerial vehicle 10 may be realized by a control program that is stored in memory 1002 and runs in processor 1001. The various types of processing may be executed by one processor 1001, or may be executed simultaneously or sequentially by two or more processors 1001. Processor 1001 may be implemented using one or more chips. It is of note that a program may be transmitted from communication network 2 to aerial vehicle 10 over an electrical communication line.

Memory 1002 is a computer-readable recording medium, and may be constituted of at least one of a ROM (Read Only Memory), an EPROM (Erasable Programmable ROM), an EEPROM (Electrically Erasable Programmable ROM), a RAM (Random Access Memory), and so on, for example. Memory 1002 may also be referred to as a "register," "cache," "main memory" (a main storage apparatus), or the like. Memory 1002 can store an executable program (program code) for implementing a method according to the present embodiment, software modules, and the like.

Storage 1003 is a computer-readable recording medium, and for example, may be constituted of at least one of an optical disk such as a CD-ROM (Compact Disc ROM), a hard disk drive, a flexible disk, a magneto-optical disk (for example, a compact disk, a digital versatile disk, or a Blu-ray (registered trademark) disk), a smartcard, a flash memory (for example, a card, a stick, or a key drive), a Floppy (registered trademark) disk, a magnetic strip, and the like. Storage 1003 may be referred to as an auxiliary storage apparatus. Storage 1003 stores identification information of aerial vehicle 10 (referred to as aerial vehicle identification information), for example. This aerial vehicle identification information is used by server apparatus 20 to identify and control aerial vehicle 10.

Communication unit 1004 is hardware (a transmitting and receiving device) for performing communication between computers via communication network 2, and is also referred to as a network device, a network controller, a network card, and a communication module, for example. Communication unit 1004 may be constituted of a high frequency switch, a duplexer, a filter, a frequency synthesizer, and the like, in order to realize at least one of frequency division duplex (FDD) and time division duplex (TDD), for example. For example, a transmitting and receiving antenna, an amplifier unit, a transmitting and receiving unit, a transmission path interface, and the like may also be realized by communication unit 1004. The transmitting and receiving unit may be implemented by physically or logically separating the transmission control unit and the receiving unit.

Input unit 1005 is an input device (e.g., key, microphone, switch, button, and the like) that receives an input from an external apparatus, and in particular, includes an image capturing apparatus. Output unit 1006 is an output device (e.g., display, speaker, LED lamp, and the like) that performs output to an external apparatus.

Flight unit 1007 is a mechanism that enables aerial vehicle 10 to fly (in the air), and includes a propeller, a motor and a driving mechanism for driving the propeller, for example.

Sensor 1008 is constituted of a group of sensors including a temperature sensor, a rotation speed sensor for detecting a number of rotations of a motor, a sensor for detecting a value relative to an input/output such as a current/voltage (e.g., a battery power remaining capacity sensor), a gyrosensor, an acceleration sensor, an atmospheric pressure (altitude) sensor, a magnetic (direction) sensor, an ultrasonic sensor, and the like.

GPS unit 1009 measures a three-dimensional position of aerial vehicle 10. GPS unit 1009 is a GPS receiver, and measures a position of aerial vehicle 10 based on GPS signals received from a plurality of satellites.

Apparatuses such as processor 1001 and memory 1002 are connected via a bus for communicating information. The bus may be constituted of a single bus, or may be constituted of a plurality of buses for connections between apparatuses.

Aerial vehicle 10 may be constituted of hardware such as a microprocessor, a digital signal processor (DSP), an ASIC (Application Specific Integrated Circuit), a PLD (Programmable Logic Device), an FPGA (Field Programmable Gate Array), and the like, and some of or all of the functional blocks may be realized by the hardware. For example, processor 1001 may be implemented using at least one piece of hardware.

Wireless terminal 40 includes a GPS unit and a communication unit similar to those of aerial vehicle 10, and transmits position information (including a time stamp indicating a time at which positioning is performed and terminal identification information of wireless terminal 40) obtained by positioning performed by the GPS unit from the communication unit to server apparatus 20 via communication network 2. From the position information history of wireless terminal 40, the position where animal 30 stayed in the past and the time during which animal 30 stayed can be specified.

Figure 3:
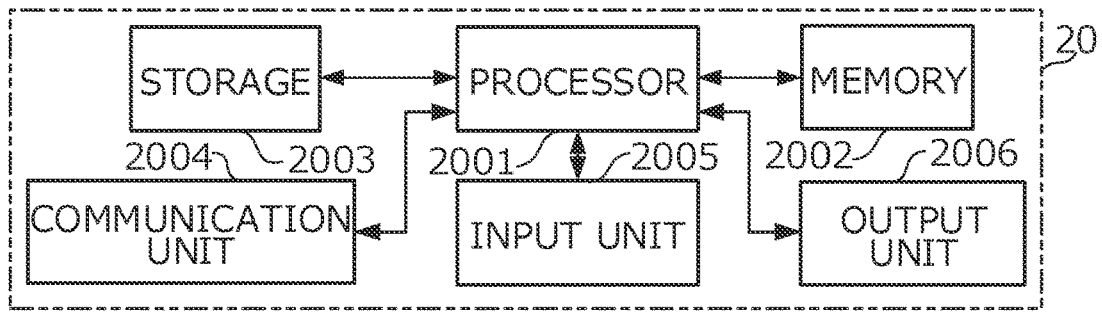
FIG. 3 is a diagram illustrating a hardware configuration of server apparatus in accordance with the present invention.

FIG. 3 is a diagram illustrating a hardware configuration of server apparatus 20. Physically, server apparatus 20 is configured as a computer apparatus that includes processor 2001, memory 2002, storage 2003, communication unit 2004, input unit 2005, output unit 2006, and a bus for connecting these apparatuses. Functions of server apparatus 20 are realized by causing predetermined software (programs) to be loaded in hardware such as processor 2001 and memory 2002, and processor 2001 performing computational operations to control communication by communication unit 2004, and to control at least one of reading and writing of data in memory 2002 and storage 2003. As hardware, processor 2001, memory 2002, storage 2003, communication unit 2004, and the bus for connecting these apparatuses are similar respectively to processor 1001, memory 1002, storage 1003, communication unit 1004, and the bus for connecting these apparatuses as described with regard to aerial vehicle 10, and thus description thereof will be omitted.

Storage 2003 stores terminal identification information and the position information history of each wireless terminal 40 in association. It is of note that the terminal identification information of wireless terminal 40 corresponds to an animal type, and a type of an animal to which wireless terminal 40 is attached can be specified from the terminal identification information.

Input unit 2005 is an input device (e.g., keyboard, mouse, microphone, switch, button, sensor, joystick, ball controller, and the like) for receiving input from an external apparatus. Output unit 2006 is an output device (e.g., display, speaker, LED lamp, and the like) for performing output to an external apparatus. It is of note that input unit 2005 and output unit 2006 may be integrally configured (e.g., may be a touch panel).

Figure 4:
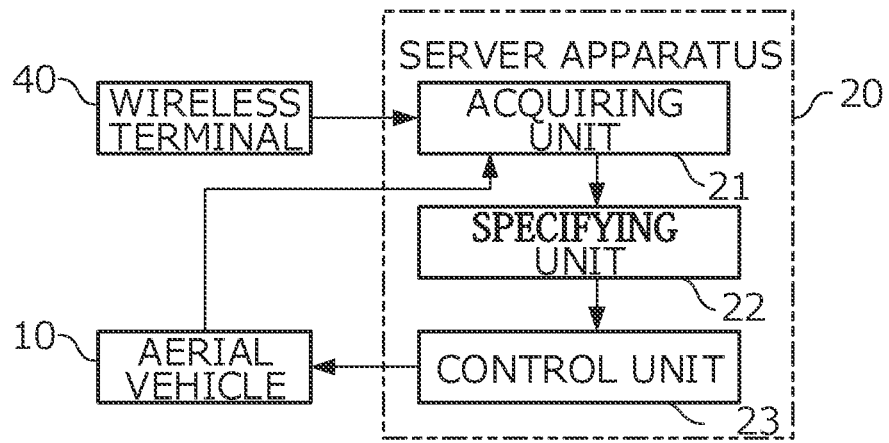
FIG. 4 is a diagram illustrating an example of a functional configuration of flight system in accordance with the present invention.

FIG. 4 is a diagram illustrating an example of a functional configuration of flight system 1. In server apparatus 20, acquiring unit 21 acquires various types of data (e.g., a measured position and various types of (behavior) data such as an attitude of aerial vehicle 10 and captured image data obtained by aerial vehicle 10) from aerial vehicle 10 via communication network 2. Also, acquiring unit 21 acquires position information of wireless terminal 40 from wireless terminal 40 via communication network 2. Further, acquiring unit 21 acquires a past weather history, a current weather state, and a future weather forecast from a weather information accumulation apparatus (not shown).

Specifying unit 22 specifies a checking area in which a state of an animal group is checked and a checking time at which the check is performed, based on the position information history (that is, the movement history of the animal group) of wireless terminal 40. Specifically, specifying unit 22 generates an artificial intelligence model by performing machine learning in which a type of animal 30 and past weather corresponding to a time stamp included in the position information of animal 30 are explanatory variables, and a position of animal 30 and a time at which animal 30 remained at the position are objective variables. Then, specifying unit 22 inputs into the artificial intelligence model a type of animal 30 to be observed (e.g., sheep) and a weather forecast (e.g., tomorrow's weather forecast) for a period during which animal 30 of interest is scheduled to be observed, and specifies the position of animal 30 for this period and a time (that is, a future time based on an estimated movement route of animal 30). The estimated movement route is specified for each individual animal 30, and therefore specifying unit 22 specifies the checking area and checking time by performing statistical processing on the estimated movement routes of individual animals of animals 30. Specifically, if an area and time can be specified within which a maximally large and dense number of animals 30 congregate, a large number of animals can be captured using a small number of image capture times. Thus, an area and time are specified as the checking area and the checking time.

Control unit 23 performs control such that aerial vehicle 10 is caused to fly to the checking area specified by specifying unit 22 and perform image capturing. Specifically, control unit 23 causes aerial vehicle 10 to fly to a position corresponding to the centroid or center of the checking area specified by specifying unit 22, and to exhaustively capture images of the animal group in an area within a range of aerial vehicle 10 by causing aerial vehicle 10 to rotate 360 degrees in a horizontal plane.

Operations

Next, operations of server apparatus 20 will be described. It is of note that in the following description, when server apparatus 20 is described as an agent of processing, the meaning of the description is that the processing is executed by processor 2001 that performs computation responsive to predetermined software (program) being loaded into hardware such as processor 2001 and memory 2002, and control of communication by communication unit 2004 and reading and/or writing of data in memory 2002 and storage 2003. This description is also applicable to aerial vehicle 10.

Figure 5:
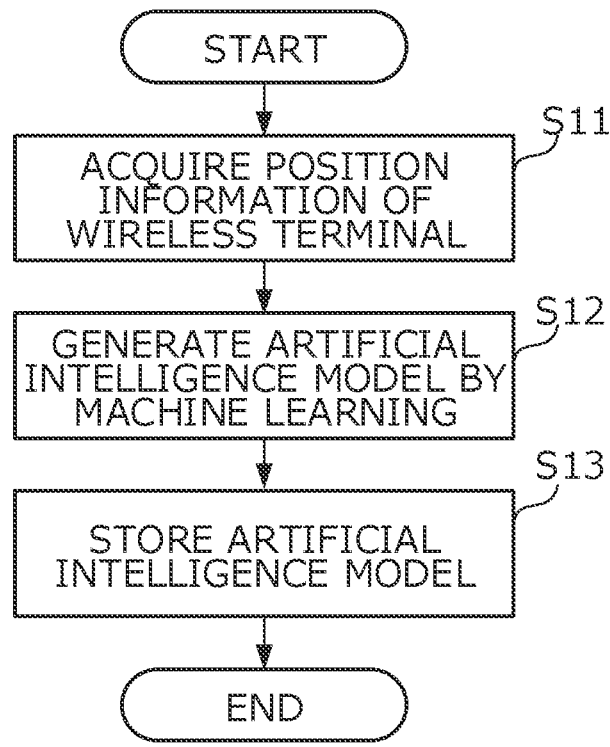
FIG. 5 is a flowchart illustrating an example of a machine learning operation performed by server apparatus in accordance with the present invention.

First, the machine learning operation performed by server apparatus 20 will be described with reference to FIG. 5. In FIG. 5, acquiring unit 21 of server apparatus 20 regularly acquires position information from wireless terminal 40 via communication network 2, for example (step S11). The acquired position information is stored in storage 2003 of server apparatus 20 as movement history of an animal group.

Next, specifying unit 22 generates an artificial intelligence model by performing machine learning by which the type of animal 30 and the past weather corresponding to a time stamp included in position information of wireless terminal 40 are explanatory variables and the position of the wireless terminal 40 and the time stamp (that is, the position of animal 30 and a time during which animal 30 remained at the position) are objective variables (step S12). As described above, the terminal identification information included in position information of wireless terminal 40 corresponds to the type of animal 30, and therefore specifying unit 22 need only specify the type of animal 30 from the terminal identification information included in the position information of wireless terminal 40.

Specifying unit 22 then stores the generated artificial intelligence model in storage 2003 (step S13).

Figure 6:
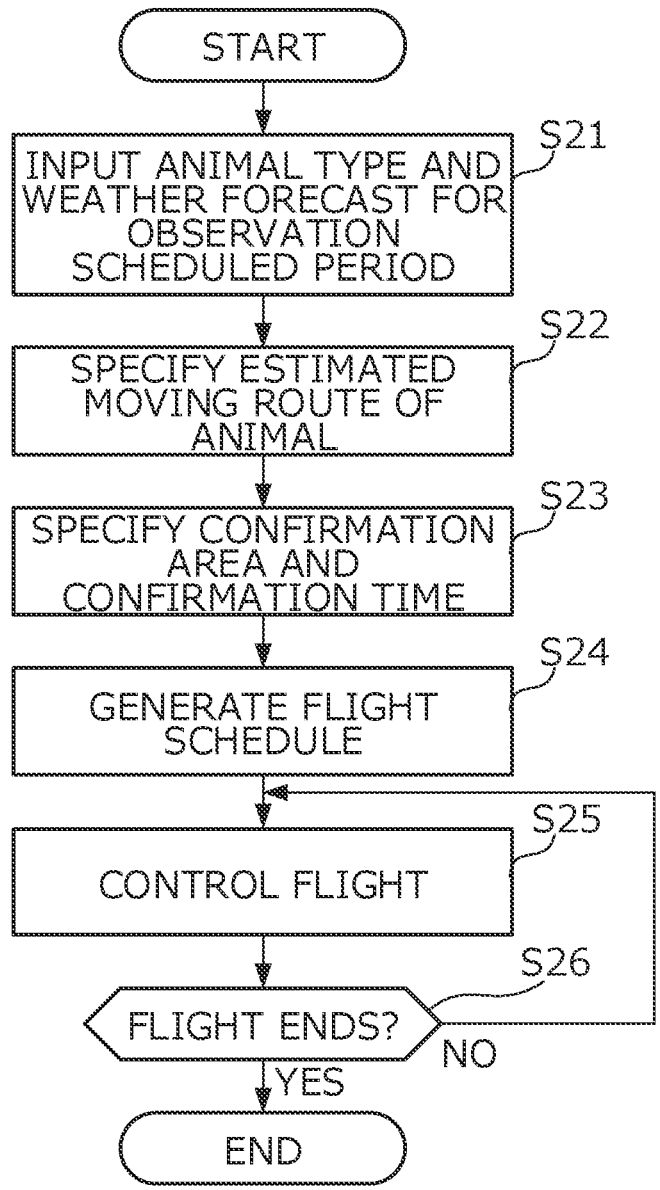
FIG. 6 is a flowchart illustrating an example of an operation for checking a state of an animal group performed by server apparatus in accordance with the present invention.

Next, operations for checking a state of an animal group performed by server apparatus 20 will be described with reference to FIG. 6. In FIG. 6, specifying unit 22 of server apparatus 20 inputs into the artificial intelligence model a type of animal 30 to be observed and a weather forecast for a period during which animal 30 of interest is scheduled to be observed (step S21), and specifies the estimated movement route of animal 30 in the period that is scheduled for observation (step S22).

Then, specifying unit 22 specifies, for example, an area and a time within which a maximally large and dense number of animals 30 congregate, as the checking area and checking time of the animal group based on the estimated movement route (step S23). A plurality of checking areas and checking times may also be specified for a single animal group.

Control unit 23 generates a flight schedule for aerial vehicle 10 to reach the specified checking area at the specified checking time (step S24), and controls aerial vehicle 10 following the flight schedule (step S25). The flight control is repeated until the flight of aerial vehicle 10 ends (step S26; YES).

According to the embodiment described above, a state of an animal group such as livestock can be efficiently performed.

Modifications

The present invention is not limited to the embodiment described above, and the embodiment above may be modified as described below. Moreover, two or more of the following modifications may be combined, as appropriate.

Modification 1

The configuration may also be such that specifying unit 22 specifies a checking area and checking time at which animals 30 of a threshold number or more are facing in the same direction, based on the movement direction specified from the movement history of the animal group, and control unit 23 causes aerial vehicle 10 to fly in a direction directly facing the animal group so as to capture faces of animals 30 in the checking area and at the checking time specified by specifying unit 22. Specifically, when specifying the checking area and checking time by performing statistical processing on estimated movement routes of individual animals, specifying unit 22 specifies a checking area and a checking time at which animals of a threshold number or more are moving in the same direction within a predetermined range (e.g., the difference in movement direction is less than ±10 degrees). Here, it is assumed that a face of each animal 30 is directed in its direction of movement. Control unit 23 controls aerial vehicle 10 to fly in a direction directly facing a plurality of animals of a threshold number or more that face in the same direction in the specified checking area and at the checking time, so as to capture the faces of animals 30. In many cases, a health state of an animal can be determined mainly by observing the face of the animal, and therefore health states of animals can be efficiently and accurately checked by use of this method.

Modification 2

Specifying unit 22 may also specify the checking area and checking time based on the difference between the movement route of an animal group that is estimated based on the movement history of the animal group and latest position information of the animal group. That is, there are cases where the movement route of an animal group estimated based on the movement history of the animal group differs from the actual movement route of the animal group. In such a case, specifying unit 22 need only correct the movement route of the animal group estimated based on the movement history of the animal group from the latest position information of the animal group.

Modification 3

Specifying unit 22 may also specify the checking area and checking time based on image capturing conditions at a time when aerial vehicle 10 captures images of an animal group. The image capturing conditions referred to here include weather (whether a light level suitable for image-capturing can be secured), a time slot (daytime, night time, or the like, whether the time slot is a time slot in which a light level suitable for image-capturing can be secured), a land condition (e.g., whether the landform provides good visibility for image-capturing), a relationship between sunlight and animal face direction (that is, whether the sunlight is direct light or backlight relative to the faces of the animals for image capture), and the like.

Modification 4

In this embodiment, the checking area and checking time are an area and a time in which a maximally large and dense number of animals 30 congregate within the checking area and the checking time; although, it may be the case that a number of individual animals that are not a part of the group of animals 30 may also be present. Such individual animals may behave independently from the group. To reduce incidence of capturing such individual animals. specifying unit 22 may specify a checking area and a checking time for capturing only such individual animals. Therefore, the terminal identification information is provided on wireless terminal 40 as a bar code or as characters, for example, and specifying unit 22 specifies terminal identification information of an individual animal hitherto not regularly captured upon performing image analysis on a plurality of pieces of past captured image data of aerial vehicle 10. Specifying unit 22 then specifies the estimated movement route of such an individual using the generated artificial intelligence model, and specifies the checking area and checking time for the individual. Here, when there are a plurality of individual animals that were not regularly captured, specifying unit 22 may specify the checking area and checking time such that the plurality of individual animals can be collectively captured to as great an extent as possible. In this way, specifying unit 22 may extract individual animals, of an animal group, that were not frequently captured in a first checking area to checking a state of the animal group, and specify a second checking area for determining the states of the extracted individual animals, and control unit 23 may perform control such that aerial vehicle 10 is caused to fly to the first checking area and the second checking area specified by specifying unit 22.

Modification 5

The animals to be image captured are not limited to livestock. Also, information on weather is not necessarily essential when specifying the checking area and checking time. Further, specifying unit 22 need only specify the checking area, and need not essentially specify the checking time. If only aerial vehicle 10 is caused to fly to a checking area without specifying a checking time, it is still assured that the animals will pass through the checking area covered by aerial vehicle 10.

Other Modifications

It is of note that the block diagram used in the description of the above embodiment shows functional unit blocks. These functional blocks (constituent units) can be realized by any combination of at least one of hardware and software. The method of realizing each functional block is not particularly limited. That is, each functional block may be realized by using a physically or logically coupled single apparatus, or may be realized by directly or indirectly connecting two or more apparatus that are physically or logically separate (by way of, for example, a wired connection, a wireless connection, or the like), and using the plurality of apparatus. Functional blocks may also be realized by combining with software one or a plurality of apparatus.

Examples of functions include determining, deciding, summing, calculating, processing, deriving, surveying, searching, confirming, receiving, transmitting, outputting, accessing, solving, selecting, setting, establishing, comparing, assuming, expecting, considering, broadcasting, notifying, communicating, forwarding, configuring, reconfiguring, allocating, mapping, assigning, and the like, but these are not limitations. For example, a functional block (constituent unit) that causes transmission to function is referred to as a transmission control unit (transmitting unit) or a transmitter (transmitter). As described above, the method of realizing a function is not particularly limited.

For example, the server apparatus or the like in one embodiment of present disclosure may function as a computer that performs processing of present disclosure.

The modes/embodiment described in the present disclosure can be applied to at least one of a system that uses LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), or another appropriate system, and a next-generation system expanded from the systems described above. Also, a plurality of systems can be applied in a combined mode (e.g., combination of at least one of LTE and LTE-A and 5G).

The order of the processing procedures, sequences, flowcharts and the like of the modes/embodiment described in the present disclosure can be changed, as long as no inconsistencies result from such change. For example, with regard to the methods described in the present disclosure, the elements of various steps are presented using an illustrative order, and are not limited to the specific order in which they are presented.

Information and the like that has been input/output may be saved in a specific location (for example, a memory), or may be managed using a management table. The information and the like that is input/output can be overwritten, updated, or augmented. Information and the like that has been output may be deleted. Information and the like that has been input may be transmitted to another apparatus.

Determination may be performed according to a value (0 or 1) represented by 1 bit, or may be performed according to a Boolean value (Boolean: true or false), or may be performed by comparing numerical values (for example, comparison with a predetermined value).

Although the present disclosure has been described above in detail, it will be evident to a person skilled in the art that the disclosure is not limited to the embodiment described in the disclosure. The present disclosure can be implemented in revised and modified modes without departing from the spirit and scope of the disclosure, which is defined by the description in the claims. Accordingly, the description of the present disclosure is an illustrative description and is not restrictive with respect to the disclosure.

Regardless of whether software is referred to as software, firmware, middleware, microcode, hardware description language, or by another name, "software" should be interpreted broadly as meaning commands, command sets, code, code segments, program code, programs, sub programs, software modules, applications, software applications, software packages, routines, subroutines, objects, executable files, execution threads, sequences, functions, and the like.

Additionally, software, commands, and the like may be exchanged over a transmission medium. For example, when software is transmitted from a website, a server, or another remote source using hardwired technologies such as coaxial cable, fiber optic cable, twisted pair cabling, or digital subscriber line (DSL), and/or wireless technologies such as infrared light, radio waves, or microwaves, at least one of these hardwired technologies and wireless technologies is included in the definition of "transmission medium."

The information, signals, and the like described in the present disclosure may be expressed by using any of a variety of different techniques. For example, data, instructions, commands, information, signals, bits, symbols, chips, and the like that may be referred to throughout all of the foregoing descriptions may be expressed by voltages, currents, electromagnetic waves, magnetic fields or magnetic particles, photo fields or photons, or any desired combination thereof.

It is of note that a term that has been described in the present disclosure and a term that may be required to understand the present disclosure may be replaced by a term that has the same or a similar meaning.

Also, information, a parameter, or the like that has been described in the present disclosure may be represented by an absolute value, by a relative value from a predetermined value, or by other corresponding information.

The phrase "based on" used in the present disclosure does not mean "based only on" unless specified as such. In other words, the phrase "based on" means both "based only on" and "based at least on."

Any reference to an element for which a phrase such as "first" or "second" that is used in the present disclosure does not generally limit an amount or order of such an element. These phrases may be used in the present disclosure as a convenient way of distinguishing between two or more elements. Therefore, reference to first and second elements does not mean that only the two elements are adopted, or the first element must precede the second element in any form.

The term "unit" in the configuration of each apparatus described above may be replaced by a "means," a "circuit," a "device," or the like.

In the present disclosure, use of the terms "include" and "including" and variations thereof, are comprehensively similar to the term "comprising." Moreover, the term "or" used in the present disclosure is not used exclusively with a meaning of "or."

Use of an article such as a, an, or the in the English translation of the present disclosure may include a case where a noun following these articles takes a plural form.

In the present disclosure, the phrase "A and B are different" may mean "A and B are different from each other." Thus, this phrase may mean that "A and B are each different from C." Terms such as "away" and "coupled" may be construed in a similar manner as "different."

REFERENCE SIGNS LIST

1 Flight system
2 Communication network
10 Aerial vehicle
1001 Processor
1002 Memory
1003 Storage
1004 Communication unit
1005 Input unit
1006 Output unit
1007 Flight unit 1008 Sensor
1009 GPS unit
20 Server apparatus
21 Acquiring unit
22 Specifying unit
23 Control unit
2001 Processor
2002 Memory
2003 Storage
2004 Communication unit
2005 Input unit
2006 Output unit
30 Animal
40 Wireless terminal

What is claimed is:

1. An information processing apparatus comprising:
a processor configured to:
estimate a movement route of an animal group and specify a checking area and a timing that satisfies a predetermined condition based on an estimated density of animals in the animal group and on a movement history of the animal group;
perform control such that an aerial vehicle that captures images of the animal group is caused to fly to the checking area at the timing specified by the processor;
specify the checking area in which the animals of the animal group of a threshold number or more are facing in the same direction based on a movement direction specified from the movement history of the animal group; and
cause the aerial vehicle to fly in a direction directly facing the animal group in the checking area specified by the processor so as to capture faces of the animals.

2. The information processing apparatus according to claim 1, wherein the processor is further configured to specify the checking area and a time within which the animal group remains in the checking area based on the movement history of the animal group, and perform control such that the aerial vehicle is caused to fly so as to arrive at the checking area specified by the processor at the time specified by the processor.

3. The information processing apparatus according to claim 1, wherein the processor is further configured to specify the checking area based on information of a weather history corresponding to when the animal group moved in addition to the movement history of the animal group.

4. The information processing apparatus according to claim 1, wherein the processor is further configured to specify the checking area based on a difference between the movement route of the animal group that was estimated based on the movement history of the animal group and latest position information of the animal group.

5. The information processing apparatus according to claim 1, wherein the processor is further configured to specify the checking area further based on image capturing conditions when the aerial vehicle captures the images of the animal group.

6. An information processing apparatus comprising:
a processor configured to:
estimate a movement route of an animal group and specify a checking area and a timing that satisfies a predetermined condition based on an estimated density of animals in the animal group and on a movement history of the animal group;
perform control such that an aerial vehicle that captures images of the animal group is caused to fly to the checking area at the timing specified by the processor;
extract images of individual animals of the animal group, that behave independently from the animal group in a first checking area in which a state of the animal group was checked;
specify a second checking area in which the state of the extracted individual animals is checked; and
perform control such that the aerial vehicle is caused to fly to the first checking area and second checking area that were specified by the processor.

7. An information processing method comprising:
estimating a movement route of an animal group and specifying a checking area and a timing that satisfies a predetermined condition based on an estimated density of animals in the animal group and on a movement history of the animal group;
performing control such that an aerial vehicle that captures images of the animal group is caused to fly to the checking area at the time specified;
specifying the checking area in which animals of the animal group of a threshold number or more are facing in the same direction based on a movement direction specified from the movement history of the animal group; and
causing the aerial vehicle to fly in a direction directly facing the animal group in the checking area specified so as to capture faces of the animals.

8. An information processing method comprising:
estimating a movement route of an animal group and specify a checking area and a timing that satisfies a predetermined condition based on an estimated density of animals in the animal group and on a movement history of the animal group;
performing control such that an aerial vehicle that captures images of the animal group is caused to fly to the checking area at the timing specified by the processor;
extracting images of individual animals of the animal group, that behave independently from the animal group in a first checking area in which a state of the animal group was checked;
specifying a second checking area in which the state of the extracted individual animals is checked; and
performing control such that the aerial vehicle is caused to fly to the first checking area and second checking area that were specified.

* * * * *